Oct. 13, 1925.

G. W. VREELAND 1,557,123

METHOD OF HANDLING FLUE DUST

Filed Oct. 13, 1921

Witness
Edwin Trueb

Inventor:
GEORGE W. VREELAND,
By D. Anthony Usina
his Attorney

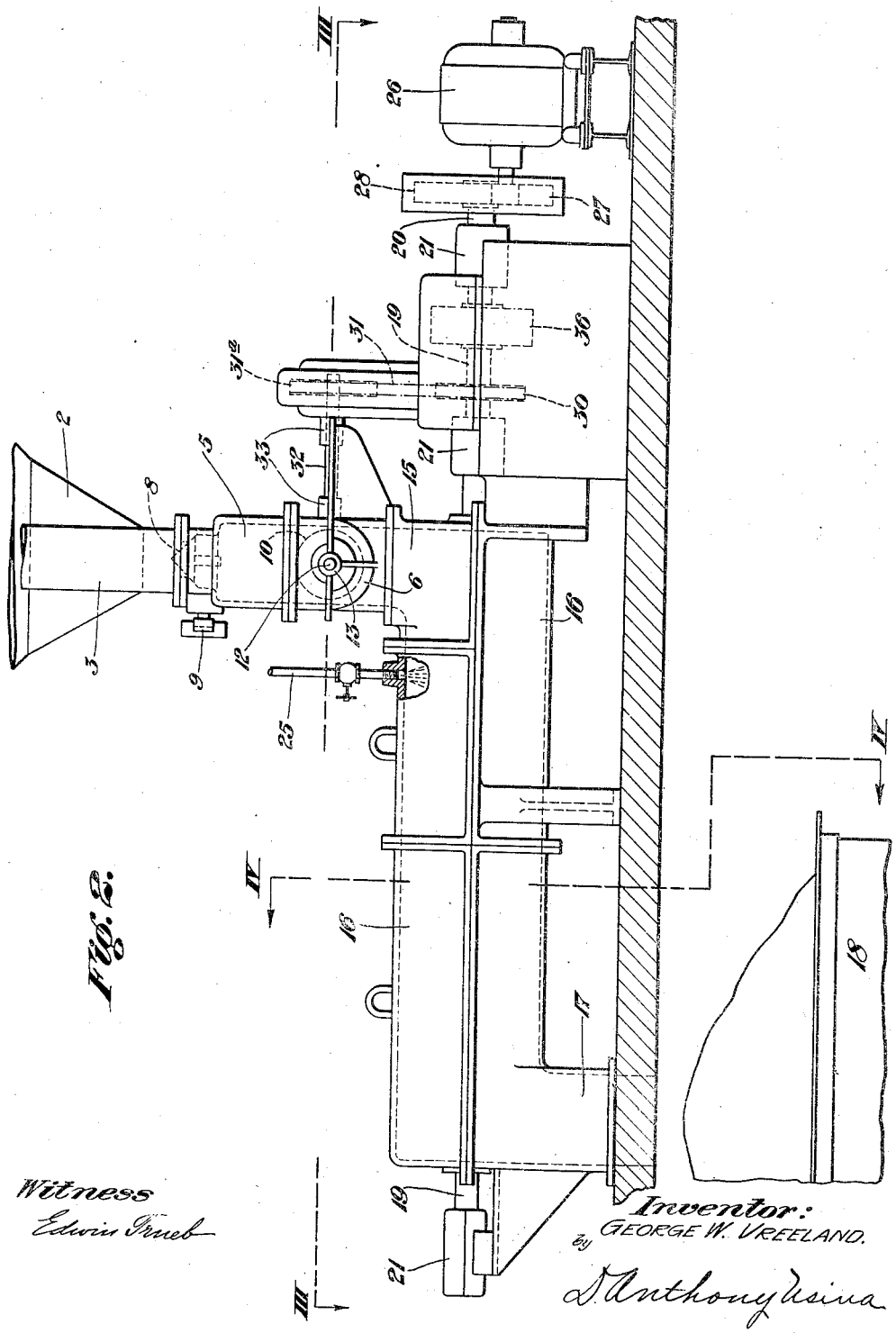

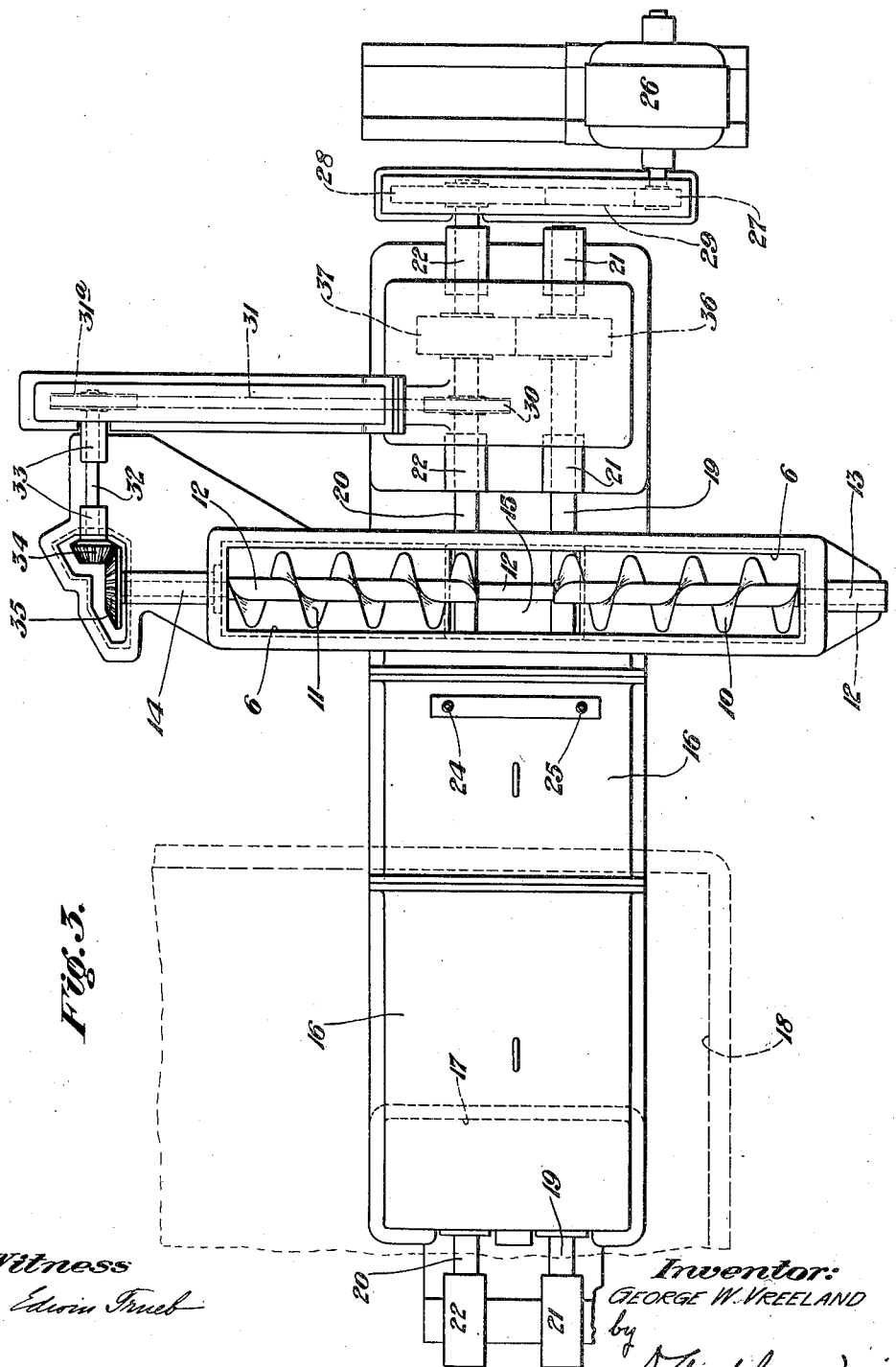

Patented Oct. 13, 1925.

1,557,123

UNITED STATES PATENT OFFICE.

GEORGE W. VREELAND, OF STEUBENVILLE, OHIO.

METHOD OF HANDLING FLUE DUST.

Application filed October 13, 1921. Serial No. 507,410.

*To all whom it may concern:*

Be it known that I, GEORGE W. VREELAND, a citizen of the United States, and resident of Steubenville, in the county of Jefferson and State of Ohio, have invented certain new and useful Improvements in Methods of Handling Flue Dust, of which the following is a specification.

My invention relates to the handling of hot blast furnace flue dust, and while not limited thereto relates more particularly to the handling of hot flue dust as it is discharged from dry gas cleaners and dust catchers.

One object of this invention is to provide a novel method of handling the hot flue dust so that it will be cooled before it is discharged into the atmosphere.

Another object of the invention is to provide an improved method whereby the flue dust will be dampened sufficiently to prevent it blowing around when discharged into the atmosphere.

Heretofore the hot flue dust has been discharged from the gas cleaners and dust catchers into cars or other receptacles, and, due to its finely divided or pulverized form it holds its heat for days. In some instances it is so hot that it will damage the car into which it is dumped. Also, due to its pulverized form it is readily scattered by slight winds and thereby forms a menace to workmen in and around the mill. The present invention eliminates the above disadvantages and provides for the handling of the hot flue dust in a highly improved manner.

Broadly, my improved method consists in discharging the flue dust from a dry gas cleaner or dust catcher directly into a closed conveyer casing, conveying the dust to a pug mill, spraying water on the dust in the pug mill and intimately mixing the dust and water so as to dampen and cool the dust, thereby facilitating the handling of the dust in cars or other receptacles, since it is sufficiently dampened to prevent scattering by the wind and sufficiently cool to permit manual handling thereof.

Referring now particularly to the drawings forming part of this specification, Figure 1 is a front elevation of the apparatus for carrying out my improved method applied to the lower end of a dry gas cleaner.

Figure 1ª is a somewhat diagrammatic side elevation of a dry gas cleaner, the lower end of which is shown on a larger scale in Figure 1.

Figure 2 is a side elevation thereof.

Figure 3 is a plan on the line III—III of Figure 2.

Figures 1, 4:
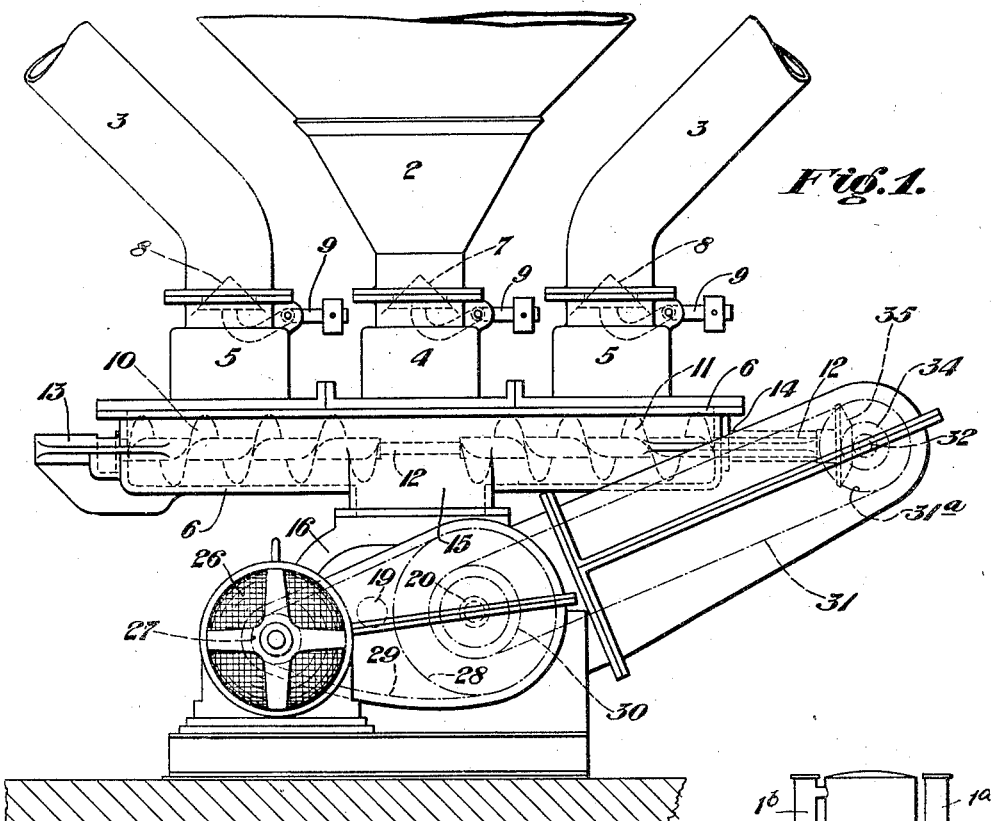
Figure 4 is a sectional rear elevation on the line IV—IV of Figure 2.

In the accompanying drawings, 1 designates a dry gas cleaner for removing the flue dust and other foreign matter from hot blast furnace gases. The cleaner 1 is provided with a hopper-like lower end 2 and dust conveying pipes 3. The pipes 3 are provided with branches 3ª which communicate with the several cleaning chambers within the cleaner. A gas inlet main 1ª and a gas outlet main 1ᵇ extend upwardly along the opposite sides of the cleaner to carry the unclean gases to the cleaner and the cleaned gases away from the cleaner. The lower end 2 of the cleaner 1 and the lower ends of the pipes or conduits 3 are connected with suitable inlets 4 and 5, respectively, in a conveyor casing 6. Suitable bells 7 and 8 are provided in the lower end of the cleaner casing 2 and pipes 3, respectively, each of which has a counterweighted control lever 9 so that they will only open to discharge the dust into the conveyer casing after a predetermined amount has collected or built up above the bells, or said bells may be operated manually at any desired time.

Right and left hand screw conveyer flights 10 and 11 are mounted on a single conveyer shaft 12 journaled in bearings 13 and 14.

The conveyer casing is provided with a central outlet 15, served by both sets of the conveyer flights 10 and 11, and communicates with an inlet in one end of a pug mill casing 16.

The pug mill casing 16 is provided with an outlet spout 17 at its opposite end through which the dust is discharged into a car 18 or other receptacle.

A pair of shafts 19 and 20 extend longitudinally within the pug mill casing 16 and are journaled in suitable bearings 21 and 22, respectively.

A plurality of blades or paddles 23 are secured on each of the shafts 19 and 20 for thoroughly mixing the flue dust. The blades or paddles 23 are angularly disposed or twisted so as to move the flue dust lengthwise of the casing 16 as it is mixed and force it to discharge through the discharge spout 17.

A pair of spray pipes 24 and 25 are arranged to enter the pug mill casing 16 adjacent its inlet end so as to spray water upon the dust as it enters the mill.

The conveyer shaft 12 and paddle shafts 19 and 20 are all driven from a single motor 26. The motor 26 is provided with a sprocket 27 which is connected to a sprocket 28 on the shaft 20 by a drive chain 29. A second sprocket 30 is mounted on the shaft 20 and is connected by a drive chain 31 to a sprocket 31$^a$ on a shaft 32 journaled in bearings 33 on a bracket extending from the conveyer casing 6. The shaft 32 is provided with a bevel gear 34 in mesh with a second bevel gear 35 on the end of the conveyer shaft 12 and gears 36 and 37 are mounted on the paddle shafts 19 and 20, respectively, and are in mesh with each other, so that the conveyer shaft 12 and paddle shafts 19 and 20 are driven simultaneously, and the paddle shafts are rotated in opposite directions to each other.

The operation of the above described apparatus in carrying out my improved method is as follows:

The hot blast furnace gases which are laden with flue dust and other foreign matter pass from the main 1$^a$ into the dry gas cleaner 1 where the dust and other foreign matter is removed and the cleaned gases pass out of the cleaner into the main 1$^b$. The flue dust and pieces of coke, limestone or other foreign matter flow from the cleaner into the conduits or pipes 3 and some also collects in the hopper-like bottom 2 of the cleaner 1. When the flue dust collected in the hopper-like bottom 2 and conduits or pipes 3 becomes sufficient to overcome the counterweighted bells 7 and 8, the bells will open and the collected dust will flow into the conveyer casing 6 and be moved or conveyed toward the central outlet port 15 by the screw conveyer flights 10 and 11 and forced to fall through the port 15 into the pug mill casing 16. As the flue dust enters the pug mill casing 16 it is sprayed with water from the spray pipes 24 and 25 and then thoroughly mixed by the blades or paddles 23 on the shafts 19 and 20 within the pug mill casing, thereby being thoroughly moistened and cooled. The flue dust is conveyed along the pug mill casing and forced to fall through the discharge spout 17 into a car or other receptacle 18 by the blades 23 due to their novel shape.

It will be readily seen that after the finely divided flue dust is thoroughly moistened and cooled it may be readily handled and conveyed from place to place since the particles will adhere sufficiently to each other to prevent it being blown around or scattered by the wind.

It will be understood that the words "dry gas cleaner" as used in the claims may include any mechanism for the separation of flue dust and the like from hot blast furnace gases by dry cleaning, whether by the well known gravity separation methods, filtering, or any other dry method.

I claim:—

1. The method of handling hot blast furnace flue dust, which consists in separating the flue dust from the hot blast furnace gases in a suitable dry gas cleaner, then passing the separated flue dust through a closed receptacle, adding water to said flue dust in the receptacle, and agitating the flue dust within the receptacle to intimately mix the water with the flue dust.

2. The method of handling hot blast furnace flue dust, which consists in separating the flue dust from the hot blast furnace gases in a suitable dry gas cleaner, then passing the separated flue dust through a pug mill, adding water to the flue dust within the pug mill and agitating the mixture therein to dampen and cool the dust.

3. The method of handling hot blast furnace flue dust, which consists in separating the flue dust from the hot blast furnace gases in a suitable dry gas cleaner, then conveying the separated flue dust to a pug mill, adding water to the flue dust within the pug mill, intimately mixing the flue dust and water to dampen and cool the dust while conveying the mixture through the pug mill and discharging the flue dust into a suitable receptacle.

4. The method of handling hot blast furnace flue dust, which consists in separating the flue dust from the hot blast furnace gases in a suitable dry gas cleaner, then conveying the separated hot flue dust from the gas cleaner through air and dust-proof conveyors to an air and dust-proof pug mill, adding water to the hot flue dust in the pug mill, intimately mixing the flue dust and water to thereby dampen and cool the flue dust in the passage thereof through the pug mill, and discharging the dampened and cooled flue dust into a suitable receptacle.

In testimony whereof I have hereunto set my hand.

GEO. W. VREELAND.